(12) United States Patent
Castellani et al.

(10) Patent No.: US 7,715,037 B2
(45) Date of Patent: May 11, 2010

(54) BI-DIRECTIONAL REMOTE VISUALIZATION FOR SUPPORTING COLLABORATIVE MACHINE TROUBLESHOOTING

(75) Inventors: Stefania Castellani, Meylan (FR); Victor Ciriza, La Tour du Pin (FR); Antonietta Grasso, Grenoble (FR); Jacki O'Neill, Hebden Bridge (GB); Peter Tolmie, Chevrieres (FR); Francois Ragnet, Venon (FR); Frederic Roulland, St. Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 1204 days.

(21) Appl. No.: 11/287,172

(22) Filed: Nov. 23, 2005

(65) Prior Publication Data

US 2006/0197973 A1 Sep. 7, 2006

Related U.S. Application Data

(60) Provisional application No. 60/657,584, filed on Mar. 1, 2005.

(51) Int. Cl.
G16F 15/10 (2006.01)
(52) U.S. Cl. ............... 358/1.15; 358/1.14; 358/406; 358/909.1; 709/206; 709/224; 704/E11.207; 704/39; 704/31
(58) Field of Classification Search ............... 358/1.14, 358/406, 1.15, 403; 709/217, 224, 206, 205, 709/207; 714/37, 31, 36, E11.207, E17.74
See application file for complete search history.

(56) References Cited

U.S. PATENT DOCUMENTS 5,038,319 A 8/1991 Carter et al.
5,057,866 A 10/1991 Hill, Jr. et al.
5,218,406 A * 6/1993 Ebner .................. 399/11

(Continued)

OTHER PUBLICATIONS

M. Bauer, et al., "'Where Are You Pointing At?' A study of Remote Collaboration in a Wearable Videoconference System", Proceedings of International Symposium on Wearable Computers; 1999.

(Continued)

*Primary Examiner*—Negussie Worku
(74) *Attorney, Agent, or Firm*—Fay Sharpe LLP

(57) ABSTRACT

A communication system and apparatus for a xerographic imaging system for enhanced collaborative communication between the machine user and the remote troubleshooting advisor. The machine includes an imager for showing a selected virtual representation of the machine including an image of the machine illustrating an area of the machine having the troubleshooting need. A communication link exists between the user and the advisor and comprises a bi-directional visualization of a selected virtual representation synchronously displayed to the user and the advisor via respective imagers. An image adjuster is operated by the expert for selective adjustment of the virtual representation to suggest a section of the area of the machine wherein action by the machine user may resolve the troubleshooting need. The selective adjustment is communicated to the machine user through the communication link whereby upon viewing this suggested adjustment, corrective action is suggested to the user. The corrective action is identified to the user by identifying a difference between the actual machine state and the shared virtual representation. The visual indicators may direct the user to a particular location and percussion centers on the machine identify a particular tapping location by the user to verify position identification to the troubleshooting expert.

20 Claims, 3 Drawing Sheets

U.S. PATENT DOCUMENTS

| | | | |
|---|---|---|---|
| 5,325,156 A | 6/1994 | Ulinski | |
| 5,365,310 A | 11/1994 | Jenkins et al. | |
| 5,404,503 A * | 4/1995 | Hill et al. | 714/31 |
| 5,636,008 A | 6/1997 | LoBiondo et al. | |
| 6,029,258 A * | 2/2000 | Ahmad | 714/46 |
| 6,065,136 A * | 5/2000 | Kuwabara | 714/31 |
| 6,279,125 B1 | 8/2001 | Klein | |
| 6,289,380 B1 * | 9/2001 | Battat et al. | 709/224 |
| 6,323,846 B1 | 11/2001 | Westerman et al. | |
| 6,487,375 B2 | 11/2002 | Ferrer et al. | |
| 6,519,429 B2 * | 2/2003 | Muramatsu | 399/82 |
| 6,591,524 B1 | 7/2003 | Lewis et al. | |
| 6,664,988 B1 | 12/2003 | Rollins | |
| 6,665,085 B1 | 12/2003 | Edmunds et al. | |
| 6,721,404 B1 | 4/2004 | Lashley et al. | |
| 6,782,495 B2 | 8/2004 | Bernklau-Halvor | |
| 6,915,343 B1 * | 7/2005 | Brewer et al. | 709/224 |
| 7,518,745 B2 * | 4/2009 | Guerraz et al. | 358/1.15 |
| 7,561,988 B2 * | 7/2009 | Matsunaga et al. | 702/188 |
| 2002/0046368 A1 | 4/2002 | Friedrich et al. | |
| 2002/0049510 A1 * | 4/2002 | Oda et al. | 700/114 |
| 2005/0172170 A1 * | 8/2005 | Thieret et al. | 714/37 |

OTHER PUBLICATIONS

Communications Assistance for Law Enforcement Act, http://www.askcalea.net/calea.html, Feb. 2005.

Cisco Systems, Inc., "Safe: IP Telephony Security in Depth", White Paper, copyright 1992-2003, pp. 1-61, http://www.cisco.com/en/US/tech/tk652/tk701/technologies_white_paper09186a00800ae41c.shtml.

J. Glera, IT Management: Outsourcing "Outsource to Cut Print Costs by up to 30%", ComputerWeekly.com, Apr. 6, 2004, pp. 1-3, http://www.computerweekly.com/Article_129651.htm.

United States Department of Health & Human Services, Office for Civil Rights—HIPPA, Medical Privacy—National Standards to Protect the Privacy of Personal Health Information, Feb. 10, 2005, http://www.hhs.gov/ocr/hipaa.

Federal Register, Part II, Department of Health and Human Services, Office of the Secretary, 45 CFR Parts 160, 162 and 164 Health Insurance Reform: Security Standards; Final Rule, Feb. 20, 2003, http://www.cms.hhs.gov/hipaa/hipaa2/regulations/security/03-3877.pdf.

Feiner, et al., "Knowledge-based augmented Reality", *Communications of the ACM*, vol. 36, No. 7, Jul. 1993.

HP Instant Support Offering Helps Save Customers Time and Money . . . , http://davesipaq.com/forum/showthread.php?p=8532#post8532, Apr. 12, 2004.

HP UK Total Print Management, Feb. 10, 2005; http://h30046.www3.hp.com/solutions/solutionhome.php?topiccode+IPG_TPM®ioncode+NA&langcode+USENG.

M. Marjalaakso, "Security Requirements and Constraints of VoIP," Helsinki University of Technology, Department of Electrical Engineering and Telecommunications, Feb. 10, 2005; http://www.hut.fi/~mmarjala/voip.

Microvision Inc., "Microvision: Nomad Expert Technician System," Product Information, Feb. 10, 2005, http://www.mvis.com/nomadexpert/info.html.

Microvision Inc., "Microvision: Nomad Expert Technician System," Automotive MRO Whitepaper, Feb. 10, 2005, http://www.mvis.com/pdfs/nomad_industry.wp.pdf.

D. Richard Kuhn, et al., "Security Considerations for Voice Over IP Systems—Recommendations of the National Institute of Standards and Technology", National Institute of Standards and Technology, Technology Adminstration, U.S. Department of Commerce, Special Publication 800-58. Jan. 2005.

Optio Software, Inc., "Optio Print Manager—The Business Need for Print Management", http://www.optiosoftware.com/solutions/enterprise/PM/need.asp, Feb. 10, 2005.

F. Robles, "The VoIP Dilemma, GIAC Security Essentials, Practical Assignment, Version 1.4b, Option 1", SANS Institute, pp. 1-12, Jun. 30, 2004.

J. Rosenberg, et al., "SIP: Session Initiation Protocol, Network Working Group, Category: Standards Track", Jun. 2002.

M. Baugher, et al., RFC 3711—The Secure Real-Time Transport Protocol (SRTP), pp. 1-55, Copyright: The Internet Society, 2004.

T. Dierks, et al., "RFC 2246—The TLS Protocol Version 1.0", pp. 1-79, Copyright: The Internet Society, 1999.

"Lines to VoIP Bandwidth Calculator", pp. 1-3, http://www.erlang.com/calculator/lipb/, Feb. 10, 2005.

K. Yamazaki, et al., "GestureLaser and GestureLaser Car—Development of an Embodied Space to support Remote Instruction", Proceedings of ECSCW 1999.

Atkinson, J.M, and Drew P., "Order in Court: the Organization of Verbal Interaction in Judicial Settings", (1979) London, Macmillan.

Fussell, S.R., Kraut, R.E. and Siegel, J., "Coordination of communications: effects of shared visual context on collaborative work", Proceedings of the CSCW 2000 Conference on Computer Supported Cooperative Work, 21-30, New York: ACM.

Fussell, S., Setlock, L., Kraut, R., "Effects of head-mounted and scene-oriented view systems on remote collaboration on physical tasks", CHI 2003, pp. 513-520.

Fussell, et al., "Assessing the value of a cursor pointing device for remote collaboration on physical tasks", CHI 2003, pp. 788-789.

Fussell, S. et al., "Gestures over video streams to support remote collaboration on physical tasks", HCI, 19, pp. 273-309.

Garfinkel, H. and Wieder, D.L., "Two incommensurable, asymmetrically alternate, technologies of social analysis", in G. Watson and R. M. Seiler (eds) *Talk in context: contributions to ethnomethodology*, New York: Sage, pp. 175-206.

Gutwin, C and Penner, R., "Improving interpretation of remote gestures with telepointer traces", Proceedings of the CSCW 2002 Conference on Computer Supported Cooperative Work, pp. 49-57, New York: ACM.

Heath, C and Luff, P., Disembodied conduct: communication through video in a multimedia office environment. Proc. of CHI'91. ACM Press. 99-103.

Heath, C and Luff, P., "Media Spaces and communicative Asymmetries: Preliminary observations of Video-mediated Interaction". HCI7(3). pp. 315-346.

Heritage, J *Garfinkel and Ethnomethodology*, 1984, Cambridge: Polity Press.

Ishii, H., Kobayashi, M, Grudin, J., Integration of interpersonal space and shared workspace: ClearBoard Design and Experiments. ACM transactions on information systems. 11(4) pp. 349-375.

Kraut, R.E., Miller, M.D., and Siegel, J., "Collaboration in performance of physical tasks: Effects on outcomes and communication", Proceedings of the CSCW 1996 Conference on Computer Supported Cooperative Work, pp. 57-66, New York: ACM.

Kraut, R., Fussell, S and Siegal, J., "Visual Information as a Conversational Resource in Collaborative Physical Tasks", HCI Special Issue: *Talking about things*, 18(1&2), pp. 13-49.

Kuzuoka, H., Kosuge, T. and Tanaka, K., GestureCam: A video communication system for sympathetic remote collaboration, *Proceedings of the CSCW 1994 Conference on Computer Supported Cooperative Work*, pp. 35-43, New York: ACM.

Kuzuoka, H., Oyama, S., Yamazaki, K. Suzuki, K and Mitsuishi, M., "GestureMan: A mobile robot that embodies a remote instructor's actions", Proceedings of the CSCW 2000 Conference on Computer Supported Cooperative Work, pp. 155-162, New York: ACM.

Luff, P. et al., "Fractured Ecologies: Creating Environments for Collaboration", HCI Special Issue: *Talking about Things*, 18(1&2), pp. 51-84.

Martin, D. and Rouncefield, M., "Making the Organization Come Alive: Talking Through and About the Technology in Remote Banking", HCI Special Issue: Talking about Things, 18(1&2), pp. 111-148.

Ou, J. et al., "Gestural communication over video stream: supporting multimodal interaction for remote collaborative physical tasks," ICMI'03. ACM, pp. 242-249.

Sacks, H., "Lectures on Conversations, Volumes I and II", Edited by G. Jefferson, Malden, MA; Blackwell (1992).

Schegloff, E.A., "Sequencing in conversational opening", American Anthropologist, 70, pp. 1075-1095.

Schegloff, E.A., "Notes on conversational practice: formulating place", in Sudnow, D (ed)., *Studies in Social Interaction*, New York: Free Press (1972).

Fussell, S., Setlock, L. and Parker, E, "Where do helpers look? Gaze targets during collaborative physical tasks.", *CHI 2003 New Horizons*, pp. 768, 769 (2003).

Jacki O'Neill, Stefania Castellani, Antonietta Grasso, Frédéric Roulland, Peter Tolmie; "Representations can be good enough", *9th European Conference on Computer Supported Cooperative Work*, Paris—France; pp. 18-22, Sep. 2005.

* cited by examiner

BI-DIRECTIONAL REMOTE VISUALIZATION FOR SUPPORTING COLLABORATIVE MACHINE TROUBLESHOOTING

CROSS REFERENCE TO RELATED PATENTS AND APPLICATIONS

This application claims the benefit of U.S. Provisional Patent Application Ser. No. 60/657,584 filed on Mar. 1, 2005 and entitled "BI-DIRECTIONAL REMOTE VISUALIZATION FOR SUPPORTING COLLABORATIVE MACHINE TROUBLESHOOTING," the entirety of which is incorporated herein by reference.

FIELD OF THE INVENTION

The present invention relates to diagnostic and customer-service systems for users of office equipment, such as copiers, printers, facsimile, or multifunction machines.

BACKGROUND OF THE INVENTION

Office equipment, such as printers or copiers, typically uses a software-based operating system to perform essential machine functions and implement the various jobs of which the machine is capable. However, software, particularly that used in high-speed multi-function machines, is subject to various problems and faults. Additional problems also arise with the machine hardware which, in machines of this type, is extremely complex and sophisticated. Hardware and software problems that occur typically happen at a low, non-periodic rate and thus are very difficult to replicate when servicing the machine and therefore difficult to resolve. Further, many of these problems are identified by the customer, who is typically not technically trained to diagnose and service machines of this type. For this reason, it is important for a servicing organization to be able to access key machine operating information, and particularly information reflecting on the performance of the machine control system and physical states of machine componentry.

A common feature of the business arrangement between the user of the equipment and the supplier is that the user is responsible, at least in part, for some maintenance and basic trouble-shooting of the equipment. Often the equipment has componentry that can be tested, manipulated and perhaps replaced by the user, but in view of the investment in the equipment, users are reluctant to engage in system repair without the strong support of the supplier and its service departments. Accordingly, enhancing the accuracy and efficiency of equipment service is based on particularly articulating or determining equipment status and the occurring problem to a remote trouble-shooting service department. Frustrating experiences with the telephone communication-to-tech support departments is universally known and the problems with unsophisticated customers trying to actually communicate a problem to the department are extremely common.

Typically, when a user encounters a problem with a machine and cannot resolve it (or does not want to solve it himself, he (or a user representative) calls a support organization for assistance, such organizations typically have troubleshooters available to help. After salient details such as the machine serial number have been taken, the troubleshooter tries to ascertain the character and extent of the problem. When the nature of the problem and its possible causes have been uncovered, the troubleshooter will either propose some ways to attempt to resolve the problem or decide at this point that the call is best passed to higher level support. Where the troubleshooter attempts to get the user to resolve the problem, aside from his own knowledge and experience he may make use of a range of resources, such as an online knowledge base, physical machines, or the advice of colleagues.

The interactions between a user experiencing a problem with a machine and a troubleshooter on the phone recurrently involve a number of phenomena. The user and the troubleshooter between them build up a description of the problem that enables consideration of what an appropriate solution might be. This can include:

the provision by the user of an initial problem description, often containing a range of contextual information about the situation the problem has arisen in;

the reformulation of this description by the troubleshooter, into terms more specifically relevant to locating a solution;

affirmation/refinement of this description by the user;

potential further joint refinement of the problem/collation of other relevant features (either verbally or by getting the user to 'go look'); and, working together through instruction, implementation, and feedback to try out possible solutions.

In doing this work both the user and the troubleshooter routinely describe physical elements of the machine and give spatial directions or descriptions. It is often necessary to describe machine parts because users do not necessarily have the technical vocabulary to identify machine parts by name. The situation in which this particular problem with this particular machine arose has to be made available, where either party may only have partial information. The full extent of the problem also needs to be inquired into and made available. This may involve asking the user to undertake additional testing activities and report back. Potential solutions must be located and instructions given, followed, and their outcomes provided.

These interactions also typically take place under circumstances where the interactants only have access to an audio channel (telephone) which is not necessarily (physically) located by the machine, thereby requiring the user to negotiate a means of accessing the machine while retaining contact with the troubleshooter. The audio channel alone means that all descriptions, instructions and feedback are only verbal and the user will be the sole source of the initial problem description, circumstantial information, the results of the attempted instructions, etc. This can result in the troubleshooter requesting that the user repeat actions, either because they do not know the user has already done these, or because they cannot be sure the user has done these correctly. For the troubleshooter, where possible solutions come from textual resources, they will have to be digested from text and then articulated through purely verbal means. As a consequence of these circumstances a number of issues arise where the resolution is, at best, sub-optimal:

The user may lack access to the machine while on the phone and need to devote effort to coordinating access with others or constantly moving between the phone and the machine.

Troubleshooters will lack potentially significant and relevant information about the current machine status, the previous actions undertaken by the user, and the machine's previous behavior.

There is a lack of mutual access to the machine resulting in effort being devoted to:

describing the current state and answering questions in order to arrive at a mutually agreed expression of the problem;

producing instructions and directions and reporting back without being able to see how instructions and directions might be appropriately framed to the current circumstance (necessitating potentially redundant feedback and varying degrees of clarification); and working out ways together to ensure that they are referring to the same physical components of the machine.

Out of these observations it is possible to recognize two inter-related and potentially critical barriers to fully effective troubleshooting via conventional means:

1. The site of the problem is removed form the site of resolution for user-machine interactions. Excessive physical movement and coordination may be demanded, there is an absence of potentially important information to relevant parties, and both the problem and the resolution must always be mediated by verbal means.

2. The user-troubleshooter interaction is not best facilitated solely over the phone. Restriction to verbal mediation only diminishes the capacity to recognize the current state of the machine, the user situation, the object of reference, and the import of instructions.

The foregoing problems have suggested various needs for improved collaborative, distributed troubleshooting of network devices such as printers or MFDs ("multi-function devices"). There is a need for the improved communication of important information to be accomplished by the use of networking and user interface ("UI") capabilities with the equipment to handle the collaboration between the user and troubleshooter, and to use sensors and actuators (LEDs in the equipment). More particularly, there is a need for the user-troubleshooter interaction to comprise making the equipment the infrastructural mediator between the troubleshooter and the user and to create a bi-directional Shared Visualization of the Problems ("SVP") which the user and troubleshooter can manipulate to thereby make coordinated informed actions in order to troubleshoot the problem.

That is, the user should be able to access technical support through the machine and then carry out the interactions with the troubleshooter via an audio-visual communication channel. This enables both parties to have a real time understanding of the actions which are being or should be performed on the machine, providing a resource for overcoming the descriptive and spatial problems which currently affect troubleshooting. The visualization allows technical support to better utilize the abilities of the remote user to carry out actions on the machine.

A number of systems using video have been suggested or designed to support remote collaboration around locally situated objects. However, video can introduce interactional difficulties or may involve considerable overhead, requiring multiple cameras or sophisticated equipment.

DETAILED DESCRIPTION

The subject system comprises apparatus and methods for negotiating common barriers arising in the user-troubleshooter interaction when trying to solve a machine problem. The machine becomes the infrastructural mediator between the troubleshooting expert and the user to create a bi-directional Shared Visualization of the Problem ("SVP") which the user-troubleshooter can manipulate for making coordinated performed actions in order to troubleshoot the problem. The user accesses technical support through the machine and carries out independent or suggested interactions with the troubleshooter via an audio-visual communication channel. Most parties thus have an enablement to real-time understanding of the actions which are being actually performed on the machine, and thereby providing a resource for overcoming the descriptive and spatial problems which commonly and currently affect the troubleshooting scenarios. The SVP allows technical support to better utilize the abilities of the remote user to carry out actions on the machine.

The machine thus enhances the troubleshooter's understanding of the problem and it further aids the discovery of a solution. The subject system mediates between the troubleshooter and the user for enabling them to mutually arrive at a solution despite not having mutual access to the problem source, i.e., the machine. Major benefits are achieved over audio-only interaction since most of the user-troubleshooter interaction involves work of a spatial nature; describing parts, delivering instructions, etc.

Figure 1:
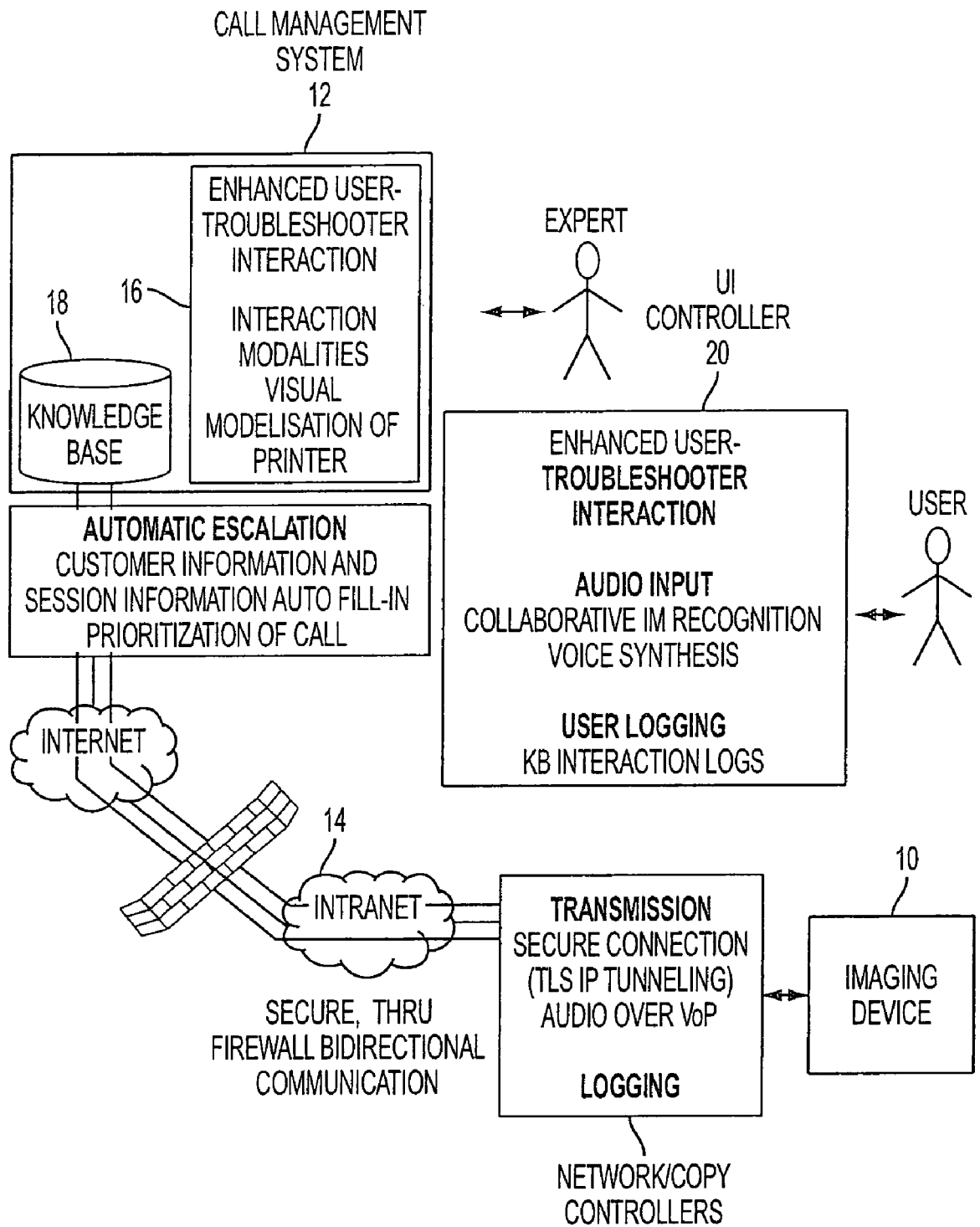
FIG. 1 is a general architecture of a bi-directional remote visualization system for supporting collaborative machine troubleshooting.

More particularly, with reference to FIG. 1, an imaging device 10 (printer/copier, MFD) is connected to a service department/troubleshooter 12 via communication link 14 comprising a conventional firewall/intranet/internet link. The troubleshooter 12 includes a call management system 16 and knowledge base 18 comprising a database including customer information and call support information, and more particularly includes in knowledge base 18 stored data identification of the machine 10 and a model of its expected visual representation as would be viewed by a user if servicing the machine. A user has access to enhanced user-troubleshooter interaction through audio input/output and a visual imaging device 20 for display of the SVP as hereinafter will be more fully detailed.

Figure 2:
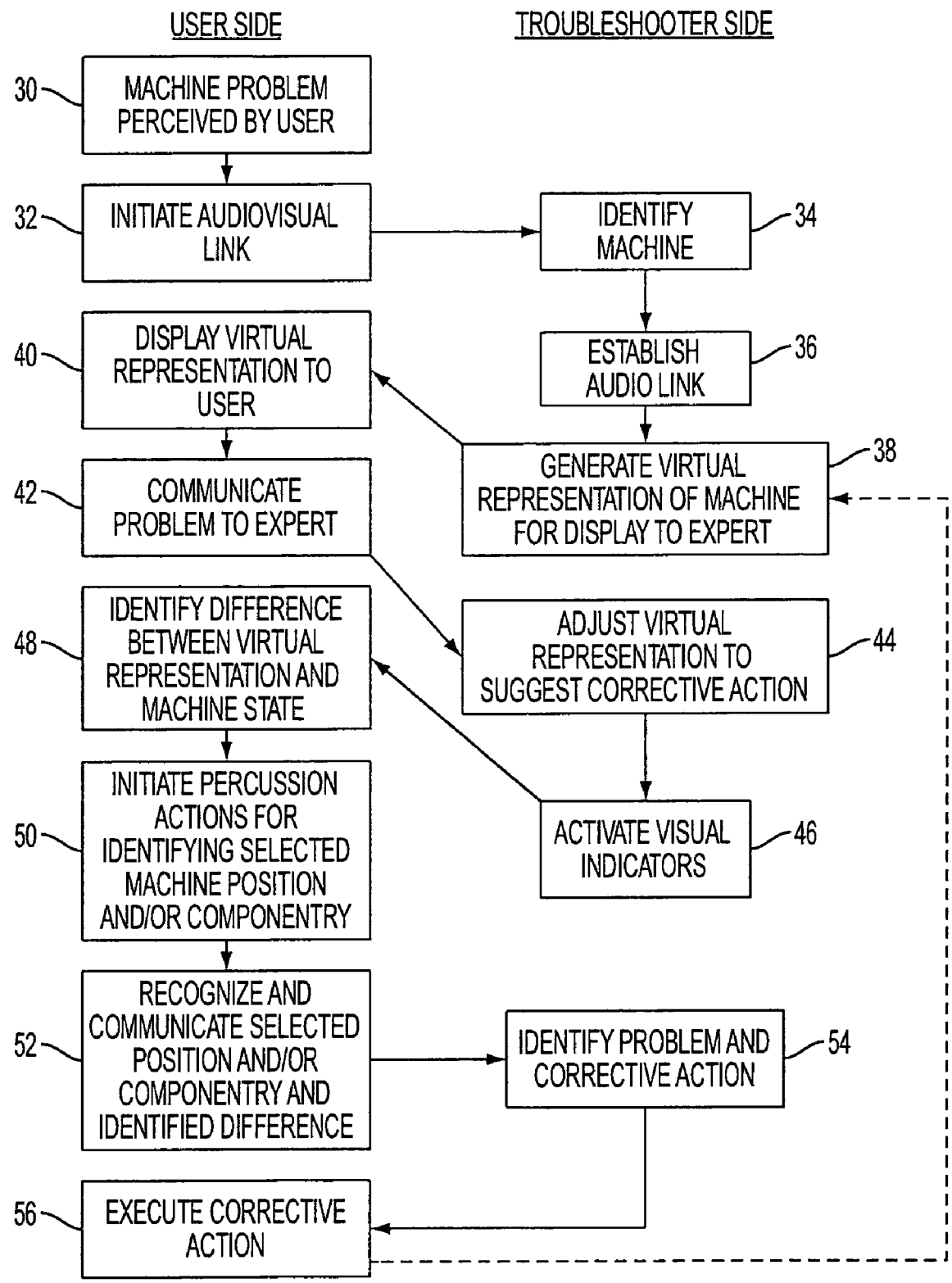
FIG. 2 is a flowchart showing the essential steps performed by a machine user and a troubleshooting expert in accordance with the subject system.

With reference to FIG. 2, the subject troubleshooting scenario is initiated when the user discovers 30 a problem with the machine that they cannot troubleshoot or fix, or do not want to fix themselves. Such a problem may be software or hardware in nature, but for the following exemplary description will be as discussed as only hardware. A call is placed 32 to a remote support center and troubleshooter 12 by selecting a "call support" button on the user interface ("UI") of the machine 10 display. Alternatively, when the machine 10 detects a problem it is so indicated to the user who is advised via the UI that they should call support. The audio-visual link comprises a secure audio end-to-end connection to the customer support center server via a secured data connection through which relevant data is transmitted. The relevant data may include any or all of the following:

machine serial number;

user ID, if the user is logged in, e.g. name and any other relevant information;

machine diagnostic data, such as sensor information on the current state of the machine;

historical information on the machine events, e.g. toner changed; and interaction data, e.g. user interaction with troubleshooting tools such as a knowledge base.

The troubleshooting remote server uses the relevant data in combination with its own stored data for identifying 34 the machine and records of other troubleshooting sessions to build an initial SVP. The user is then asked to put on a headset for establishing 36 the audio link after the placing of a service call. Alternatively, when the secure audio connection is made and an operator comes on line, this may instigate the audio and visual signal, e.g. a phone style ring and a "put on your headset" message. The initial SVP is generated 38 and synchronously display 40 to both the user and the troubleshooting expert. The user oriented version of the SVP includes a visual representation of the current status of the machine, e.g. showing which doors are opened, etc. The initial SVP for the troubleshooter may contain the following information which may vary according to what was accessible and what is relevant to the current problem:

a) History of the machine showing, if available, entries for:
   field engineers intervention session, including, e.g. replacement of pieces;
   previous collaborative troubleshooting sessions;
   previous user troubleshooting sessions;
   maintenance sessions, including, e.g. replacement of consumables;
   alerts, e.g. paper jam;
   normal interactions, e.g. opened tray 1.

The history could be represented: (1) simply as an unstructured or structured list (e.g. a tree) or (2) as a state diagram, where nodes represent status of the machine, or (3) by an animation showing the physical changes in the status of the machine. The troubleshooter can navigate the entries in the history for seeing more details, discovering actions performed by the user on the machine before calling the service or similar problems already occurred.

b) Current status of the machine including:
   1. a visual description of the machine (by a virtual model or images) as the user currently sees it. In addition, this representation could be enhanced with a view from different spatial perspectives (front-side, left-side, right-side, back-side) to facilitate at-a-glance recognition of problems;
   2. other potential options such as:
      i. a sample of an image quality problem;
      ii. a sample of noises the machine is producing;
      iii. a sample of abnormal vibrations.

c) Position of the user with respect to the machine, displayed with the visual representation of the machine and the spatial perspectives.

d) Means with which to interact through the SVP.

After the SVP interface is established, the user can perform actions on the machine and is provided with an imaging interface on a display showing the current status of the interaction. Thus, the SVP comprises a bi-directional visualization of a selected virtual representation between the machine and the advising troubleshooter.

During the troubleshooting process, the troubleshooter 12 can give the user 20 instructions on what to do to perform specific troubleshooting operations, e.g. removing parts of the machine, etc. The troubleshooter is provided with a UI showing:
   a main interactive window showing the current status of the machine as resulting from the interaction, including current sensed actions (e.g. an opened tray); the history of the machine; if known, and the position of the user.
   control buttons in the window showing actions of the user are also provided.

In order to communicate 42 the machine problem to the troubleshooting expert, the user usually needs to indicate a part of the machine. Such indication is effected by using the display of the SVP to transmit and identify a signal, e.g. a cursor can indicate the part both on a main window of the display and on the window showing the actions of the user. Also, the user can indicate a part of the machine by percussing it, e.g. tapping on that part, and/or coming into relatively close proximity to it, e.g., entering a field associated with a contactless sensor. Additionally, the user can perform an action on the printer. The information on the action performed by the user is transmitted to the troubleshooter and the troubleshooter will see the results of the user action both on the main window and on the window showing the actions of the user. Such actions, along with the audio conversation effectively communicate 42 the machine problem to the expert.

In response to the user actions, the expert on the troubleshooting side can also indicate a part of the machine represented on the main window by adjusting the SVP for the ultimate purpose of suggesting the corrective action to solve the problem. An identified part is remotely shown to the user on the machine display and, alternatively, visual indicators, e.g. LEDs, if available, facilitate part identification. The LEDs on the machine part are activated as a special assist to a particular position to the user. After such indication, the expert will then select an action that the user should perform on the machine or that part which can be represented on the main window showing the SVP. The troubleshooter selects a part and then chooses the appropriate action, e.g. pushing, pulling, rotating or combination, from a menu of available options and the amount of force to be used. Such action is shown to the user on the display and the visual indicators for the selected part are activated. When indicating the amount of force to be used on the part, different brightness intensity will indicate to the user the appropriate strength required for performing correctly the action. Also, the sense of the movement can be indicated in a sequence of activations of the visual indicators. A possibility for specifying an action for the troubleshooter could be select actions from a mnemonic resource and drag-and-drop them on to the presentation of the machine in the main window.

Alternatively, the expert can put the user on hold so that the troubleshooter will be temporarily disconnected from the user and its SVP for the purpose, for example, of making some tests without sharing them with the user. In this situation, on the user side, the window will show a message notifying the user of the holding status. By "hold" is meant a muting activity where the term "hold" serves to preserve the existing telephone metaphor used by call center troubleshooters.

An important aspect of the subject system is that the user can compare the actual state of the machine with the SVP provided by the expert to identify 48 any difference between what the expert indicates as the correct machine state in the SVP, and the actual state seen by the user. For example, if the SVP shows a particular latch as correctly being in position, and the user by the comparison can see that the latch is not in SVP position, the mispositioning of the latch may be the source of the problem and its movement to the correct position may be the desired corrective action sought by the user. In communicating the particular positioning of the subject componentry, the user may again initiate 50 percussion and/or contactless actions for identifying selective machine positions and/or the componentry. The system sensors within the machine can recognize 52 and communicate through the communication link the selected position and/or componentry for clearly identifying the difference between the actual machine state and the SVP state being considered by the expert. The problem and differences are then identified 54 to the expert who can then clearly indicate to the user the corrective action so that the user can then execute it 56.

It is to be appreciated that the foregoing example is provided for explanatory purposes and is not limiting. For instance, it is to be understood that there can be one or more communications for expressing problem and/or one or more communications for suggesting an action to resolve the problem. For example, after executing a corrective action 56, one or more other SVPs can be generated 38 and synchronously displayed 40 to both the user and the troubleshooting expert.

Figure 3:
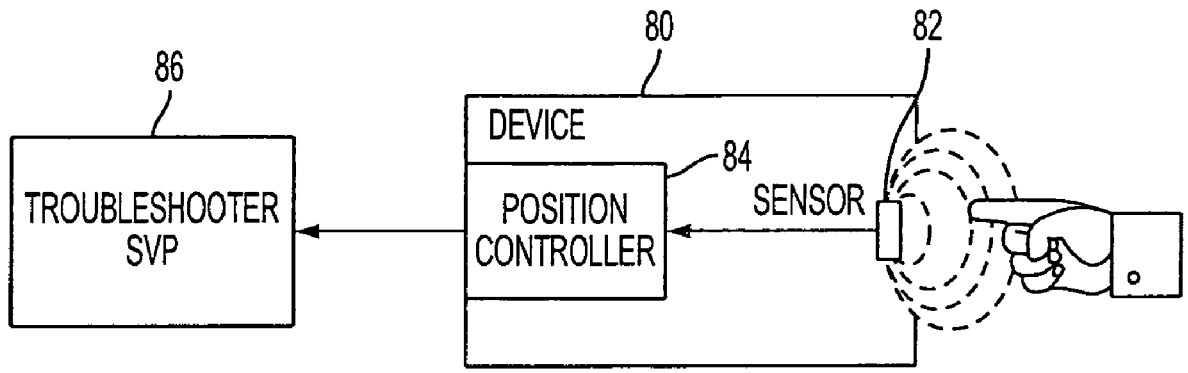
FIGS. 3-5 are block diagrams particularly illustrating selected components of an imaging system incorporating the present development.
Figure 4:
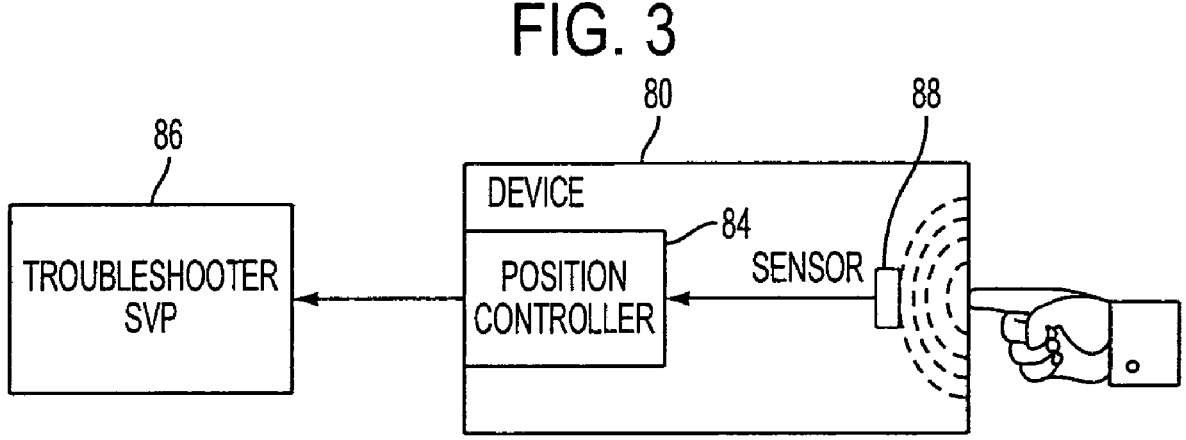
Figure 5:
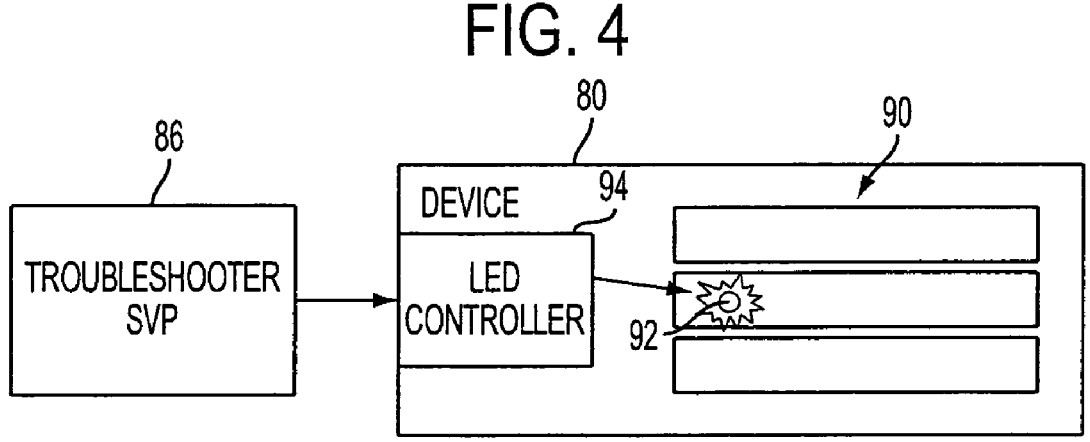

With reference to FIGS. 3, 4 and 5, exemplary devices comprising the subject system are shown. FIG. 3 illustrates a device 80 having a contactless sensor 82, e.g., a contactless capacitive sensor, which is capable of contactless detection of human proximity for identifying a component of the device 80. As described in detail above, in order to communicate the problem to the troubleshooting expert, the user usually identifies a part of the device to the expert. The user can indicate the part of the device 80 by disturbing the field generated by the contactless sensor 82, e.g. by penetrating the field with a hand or finger, as depicted. The information is conveyed to the troubleshooter via a position controller 84, and the troubleshooter can visualize the results on the SVP 86, as described in detail above. The results and any audio conversation effectively communicate the problem to the expert.

FIG. 4 illustrates the device 80 having a percussion sensor 88 for identifying a user selected component of the device 80. The user can indicate a part of the device 80 by percussing, or tapping on it. Likewise, the information is conveyed to the troubleshooter via a position controller 84, who visualize the results on the SVP 86, and the results and any audio conversation effectively communicate the problem to the expert.

FIG. 5 illustrates visual indicator positioning to better identify device or componentry positioning. In response to the user actions detected by the contactless and percussion sensors described in FIGS. 3 and 4, the expert on the troubleshooting side can indicate a part of the device 80 via the SVP 86 for suggesting a corrective action to solve the problem. An identified part is remotely shown to the user on a display 90 through various visual indicators 92 such as one or more illumination elements. As depicted, a LED controller 94 can be used to illuminate one or more of the visual indicators 92. The expert can then select an action that the user should perform on the device 80 or the identified part component of the device 80. This action is provided to the user, and the visual indicators 90 for the selected component are activated.

The protocols described above for the subject collaborative troubleshooting are merely exemplary and can be reordered in a sequence that the user and expert may determine to further enhance the efficiency of the communication process.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A communication system for supporting remote interactions between a machine user and a troubleshooting advisor engaged in troubleshooting support activities for a machine, comprising:

a machine having a troubleshooting need including an imager for showing a selected virtual representation of the machine including an image of the machine illustrating an area of the machine having the troubleshooting need, and at least one of a percussion sensors comprised of a plurality of accelerometers for detecting vibrations sensitive to percussion actions of the user for identifying a user selected component of the machine, and a contactless capacitive sensor sensitive to human body approach actions of the user for identifying a user selected component of the machine;

a communication link comprising a bi-directional visualization of the selected virtual representation between the machine and the advisor;

an advisor imager illustrating the selected virtual representation to the advisor; and an image adjuster for selective adjustment of the selected virtual representation by the advisor suggesting a section of the area of the machine wherein an action by the machine user may resolve the troubleshooting need, the selective adjustment being communicated to the machine user through the communication link, whereby upon viewing of the selected adjustment by the machine user, a comparison of the virtual shared representation with the machine is made by the user and the action is implemented to resolve the troubleshooting need.

2. The system as defined in claim 1 wherein the machine includes visual indicators for indicating the section of the area of the machine subject of the user action.

3. The system of claim 2 wherein the indicators have variable luminic intensity for characterizing the user action.

4. The system of claim 1 wherein the comparison identifies a difference between the selected adjustment of the virtual shared representation and the machine indicative of the action.

5. The system of claim 1 wherein the selective adjustment by the image adjuster comprises an update of the bi-directional visualization in response to the action by the machine user.

6. The system of claim 5 wherein the update of the bi-directional visualization is communicated to the advisor via the communication link.

7. The system of claim 1 wherein the bi-directional visualization of the virtual representation is communicated to the user and advisor in real-time.

8. The system of claim 1 further including a position recognition system for identifying a position of the percussion actions from the detected vibrations.

9. The system of claim 1 wherein the action by the machine user causes the selective adjustment of the virtual representation to identify a data attribute of the machine to the user or advisor indicative of a resolution to the troubleshooting need.

10. The system of claim 9 wherein the data attributes comprise at least one of user ID machine diagnostic data, historical information, and interaction data.

11. The system of claim 1 wherein the communication link comprises an audio-visual communication channel through the machine, for real-time shared understanding by the user and advisor of the action by the machine user.

12. The system of claim 1 wherein the bi-directional visualization of the selected virtual representation comprises a shared visual problem.

13. The system of claim 12 wherein the shared visual problem contains at least one of field engineers assigned intervening, collaborative troubleshooting sessions, maintenance sessions, replaced consumables, alerts, and normal interactions.

14. The system of claim 12 wherein the shared vision problem contains history comprised of at least one of current machine status, visual description of the machine, sample of image quality problems, sample of machine produced noises and samples of abnormal machine vibrations.

15. A method for troubleshooting a machine having a troubleshooting need by communicating with a remote advisor, comprising:

illustrating a shared virtual representation of the machine to a user and an advisor in bi-directional communication through a communication link wherein the representation includes an image of an area of the machine having the troubleshooting need, adjusting of the shared virtual representation by the advisor for suggesting a section of the area of the machine wherein an action by the user may resolve the troubleshooting need;

comparing by the user of the adjusted shared virtual representation with the machine;

performing percussion actions by the user at a particular machine position to generate position identifying vibrations, recognizing the vibrations as representation of the machine position and communicating the recognized position to the remote advisor; and implementing by the user of the action suggested by the comparing for resolving the troubleshooting need.

16. The method of claim 15 further including actuating by the advisor of visual indicators in the machine indicative of the section subject to the user action.

17. The method of claim 15 wherein the comparing comprises identifying by the user of a difference between the shared virtual representation and an actual state of the machine.

18. The method of claim 15 wherein the communicating is performed in real-time.

19. A xerographic imaging system including an interactive communication system comprising an audio-visual link between a machine user and a remote troubleshooting expert; the communication system including a user visual imager and troubleshooter imager for showing a synchronous selected virtual representation of the machine to the user and the expert; and, an image adjuster for selection adjustment of the virtual representation by the expert for directing the user to a particular position of the machine and to facilitate user understanding of a suggested corrective action to be made by the user, and visual indicators actuatable by the expert for directing the user to a selected position of the machine; and percussion sensors responsive to user percussion actions on machine componentry for identifying user tapping on the componentry.

20. The imaging system of claim 19 wherein the selective adjustment of the virtual representation identifies a difference perceived by the user between the virtual representation and an actual state of the machine suggestive of a user action for resolving a troubleshooting need.

* * * * *